US007529227B2

United States Patent
Seguin et al.

(10) Patent No.: US 7,529,227 B2
(45) Date of Patent: May 5, 2009

(54) SYSTEM AND METHOD FOR PDA TO PDA COMMUNICATION USING A NETWORK PORTAL

(75) Inventors: Jean-Marc Lucien Seguin, Stittsville (CA); Edward Peter Gancarcik, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1091 days.

(21) Appl. No.: 10/815,804

(22) Filed: Apr. 2, 2004

(65) Prior Publication Data

US 2004/0228332 A1    Nov. 18, 2004

(30) Foreign Application Priority Data

Apr. 4, 2003    (GB) .................... 0307861.5

(51) Int. Cl.
   *H04L 12/66* (2006.01)
(52) U.S. Cl. .................... 370/352; 379/93.05; 709/227
(58) Field of Classification Search .................. 379/52, 379/55.1, 56.1–56.3, 93.05–93.07; 370/346, 370/349, 352–356; 709/220, 227, 232, 238
   See application file for complete search history.

(56) References Cited

U.S. PATENT DOCUMENTS 4,221,932 A    9/1980   Anglikowski et al. ..... 179/2 EA
5,461,627 A   10/1995   Rypinski .................... 370/95.2
6,081,356 A    6/2000   Branc et al. .................. 359/118
6,336,142 B1   1/2002   Kato et al.
6,681,252 B1 *  1/2004   Schuster et al. ............. 709/227

FOREIGN PATENT DOCUMENTS

| EP | 0 483 549 | 10/1991 |
| EP | 0 878 936 | 5/1998 |
| EP | 1 175 026 | 1/2002 |
| EP | 1 271 885 A2 | 1/2003 |
| GB | 2 369 510 | 5/2002 |
| JP | 2002-135272 | 5/2002 |
| WO | WO 01/24503 A1 | 4/2001 |
| WO | WO 01/97457 A1 | 12/2001 |
| WO | 03/007162 | 1/2003 |

OTHER PUBLICATIONS

European Search Report.

* cited by examiner

*Primary Examiner*—Suhan Ni

(57) ABSTRACT

A system and method of transferring data over a network from a first portable electronic device to a second portable electronic device, each device including an infrared interface. The method comprises sending the data from the first portable electronic device to a first network portal via infrared communication, sending the data from the first network portal to a second network portal via the network, and sending the data from the second network portal to the second portable electronic device via infrared communication.

13 Claims, 5 Drawing Sheets

SYSTEM AND METHOD FOR PDA TO PDA COMMUNICATION USING A NETWORK PORTAL

FIELD OF THE INVENTION

The present invention relates to portable electronic device communications and in particular to the transfer of information from one portable electronic device to another.

BACKGROUND OF THE INVENTION

Portable electronic devices such as personal digital assistants (PDAs) are commonly used for personal record keeping such as appointments, contacts, expenses and other information. In many instances, it is desirable to transfer information from one portable electronic device to another.

Many portable electronic devices include an infrared (IR) interface for communication with compatible devices, including other portable electronic devices. Thus, these portable electronic devices are operable to send or "beam" information to another device using, for example IrDA, which is a well known protocol using infrared light pulses for data transfer.

IrDA communication suffers from the disadvantage that it is designed for "face to face" transfer of information and is limited to communications within a three-meter line-of-sight range. While this may be acceptable for "face to face" data exchange, the three-meter range is very limiting. When two portable electronic devices cannot be moved within a three-meter line-of-sight range of each other, IrDA communication cannot be effected between the two devices.

Quite apart from portable electronic devices such as PDAs, integrated networks are also known in the art for providing converged voice and data communications using TCP/IP protocol, over Local Area Networks (LANs) and Wide Area Networks (WANs). One such system, the Mitel Networks 3300 Integrated Communications Platform (ICP) delivers sophisticated call management, applications and desktop solutions, including the ability for a PDA user to communicate to a telephone device (i.e. IP telephone) for the control of call functions. In this case, the telephone device acts as a network portal for passing information such as digits from the PDA's phonebook or contacts database to call control software on the network. From the user's perspective, the PDA controls the telephone device. The PDA communicates with the network via (1) the IrDA interface between the PDA and the telephone device and (2) TCP/IP communication between the telephone device and the network.

It is an object of an aspect of the present invention to extend the known PDA communication functionality of such networks to provide an improved method of communication for portable electronic devices, such as PDAs, over a network.

SUMMARY OF THE INVENTION

Therefore, in accordance with an aspect of the present invention there is provided a method and apparatus for allowing two PDAs to "beam" files to one another using a network portal, without the three-meter restriction set forth above. More particularly, a signal path is established between the PDAs via a voice call over a voice communication network. In operation, a first PDA user calls a second PDA user over the voice network to establish the voice call. Then, the voice call path is used to beam files between the two PDAs.

Advantageously, files can be transferred between PDAs by creating a communications path first. The communications path is created by establishing a voice call. Next, data is exchanged between the PDAs. Thus, the files are transferred without the need for any central resource to manage addresses, ensuring efficient use of processing resources.

BRIEF DESCRIPTION OF THE DRAWINGS

The invention will be better understood with reference to the drawings, and following description, in which.

DETAILED DESCRIPTION OF PREFERRED AND ALTERNATIVE EMBODIMENTS

Figure 1:
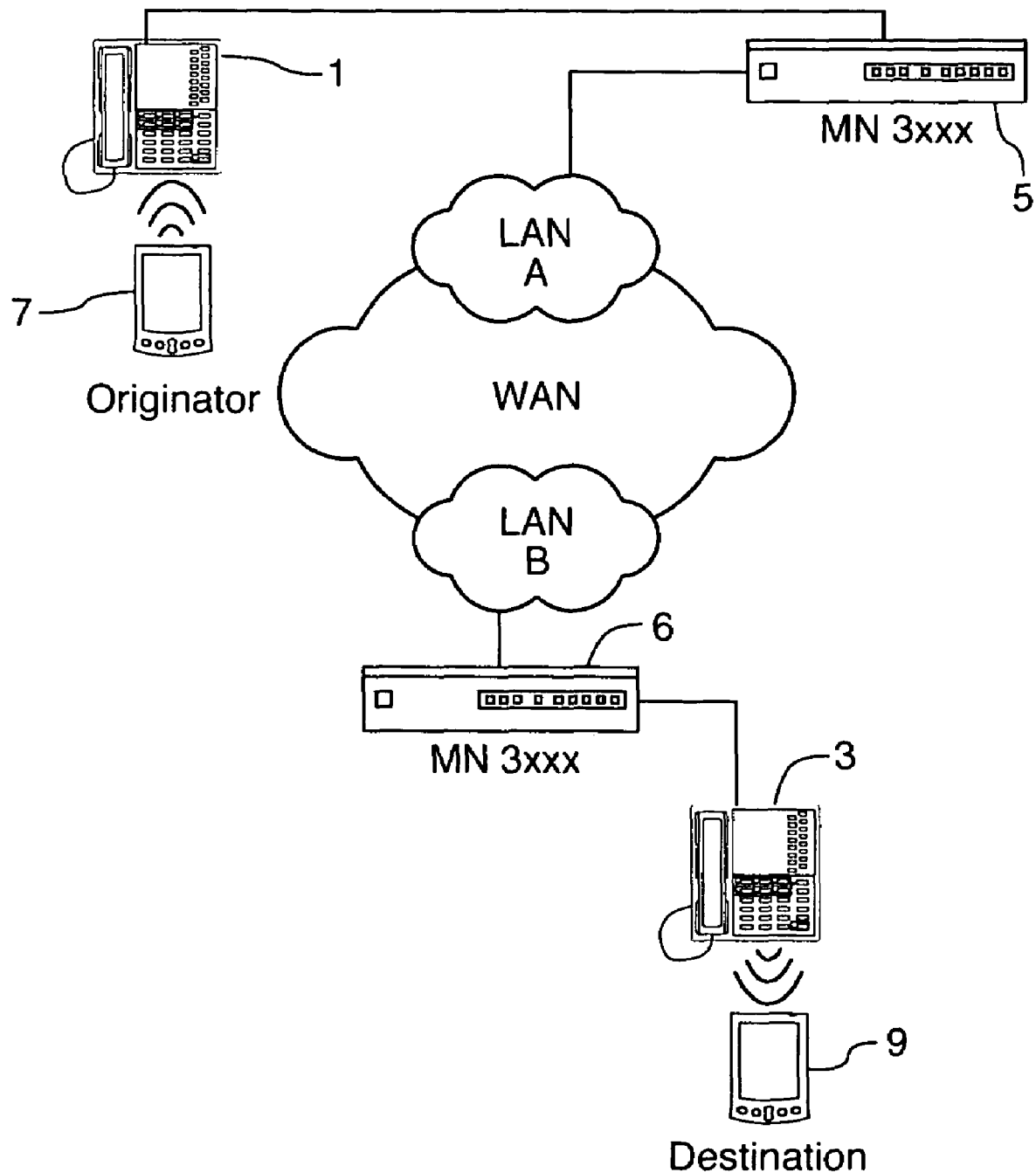
FIG. 1 is a block diagram showing an exemplary system for PDA to PDA communication using a network portal, according to the present invention.

As shown in FIG. 1, an exemplary embodiment of the system according to the present invention comprises two network portals 1 and 3 (e.g. Mitel Network Portal IP telephony devices) connected to respective ICPs 5 and 6 (e.g. Mitel Networks 3100 Integrated Communications Platform). For purposes of illustration, only a single telephony device or network portal is shown connected to each ICP whereas, in fact, there would normally be multiple such devices. Each network portal 1 and 3 supports the IrDA protocol to receive dialing commands from respective PDAs 7 and 9 using OBEX (Object Exchange), which is an application layer at the top of the IrDA protocol stack. Details of this PDA/telephony communication are set forth in Canadian Patent Application No. 2,369383filed Jan. 25, 2002 and published Jul. 27, 2002.

While the present description is directed to IrDA protocol mechanisms, it will be understood that the present invention is not limited to IrDA protocol and other wireless protocols such as Bluetooth or 802.11, are also possible between phone and mobile device.

The IrDA protocol works on a master/slave basis whereby communications are sent between two devices (such as PDAs 7 and 9). According to the present invention, each network portal 1 and 3 acts as a proxy on behalf of the associated PDA.

LAN A, LAN B and the WAN provide QoS networking/routing in a well known manner, and have no real bearing on the present invention.

Figure 2:
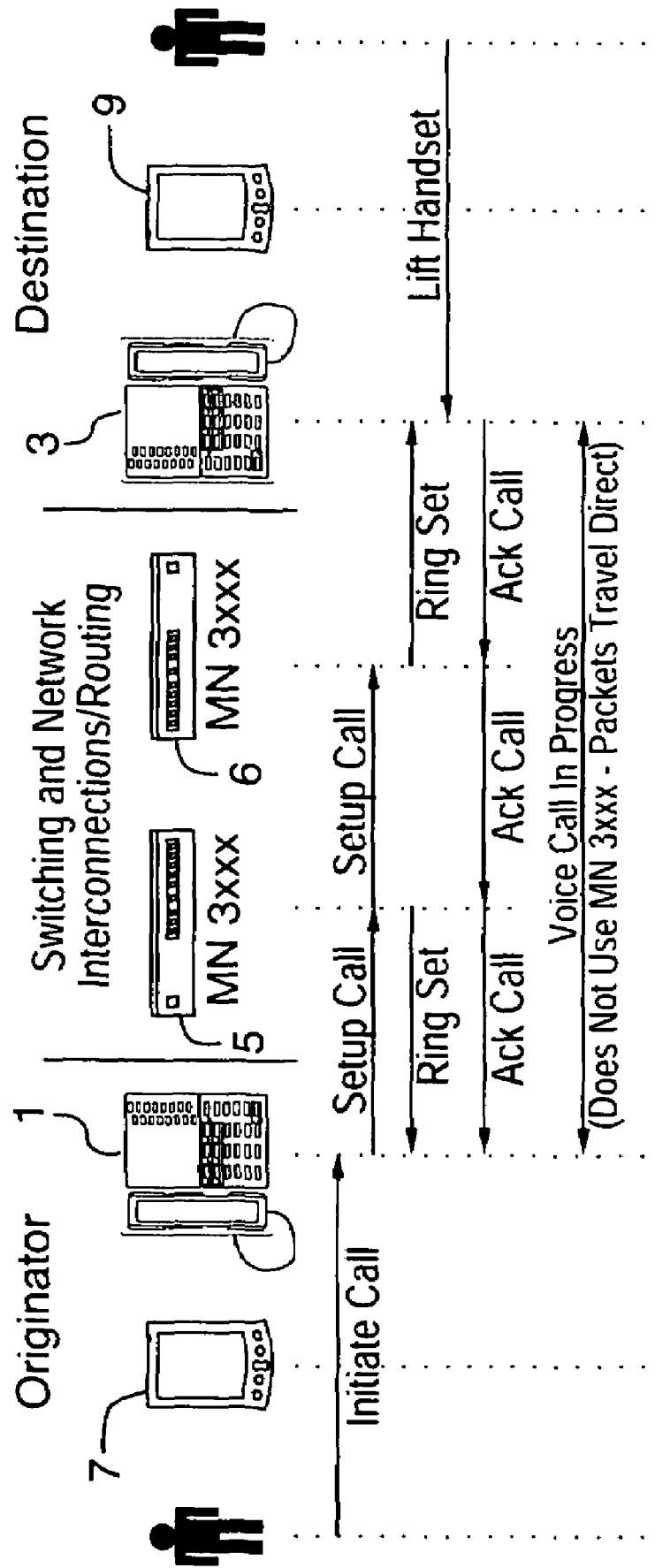
FIG. 2 is a message flow diagram showing call establishment for the system of FIG. 1.

With reference to FIG. 2, the user of PDA 7 (referred to hereinafter as the Originator) first places a voice call to the user of PDA 9 (referred to hereinafter as the Destination). Once the call is established, voice communication is effected over IP (RTP/UDP) across LANs A and B and the WAN, between the user's telephony devices 1 and 3.

Figure 3:
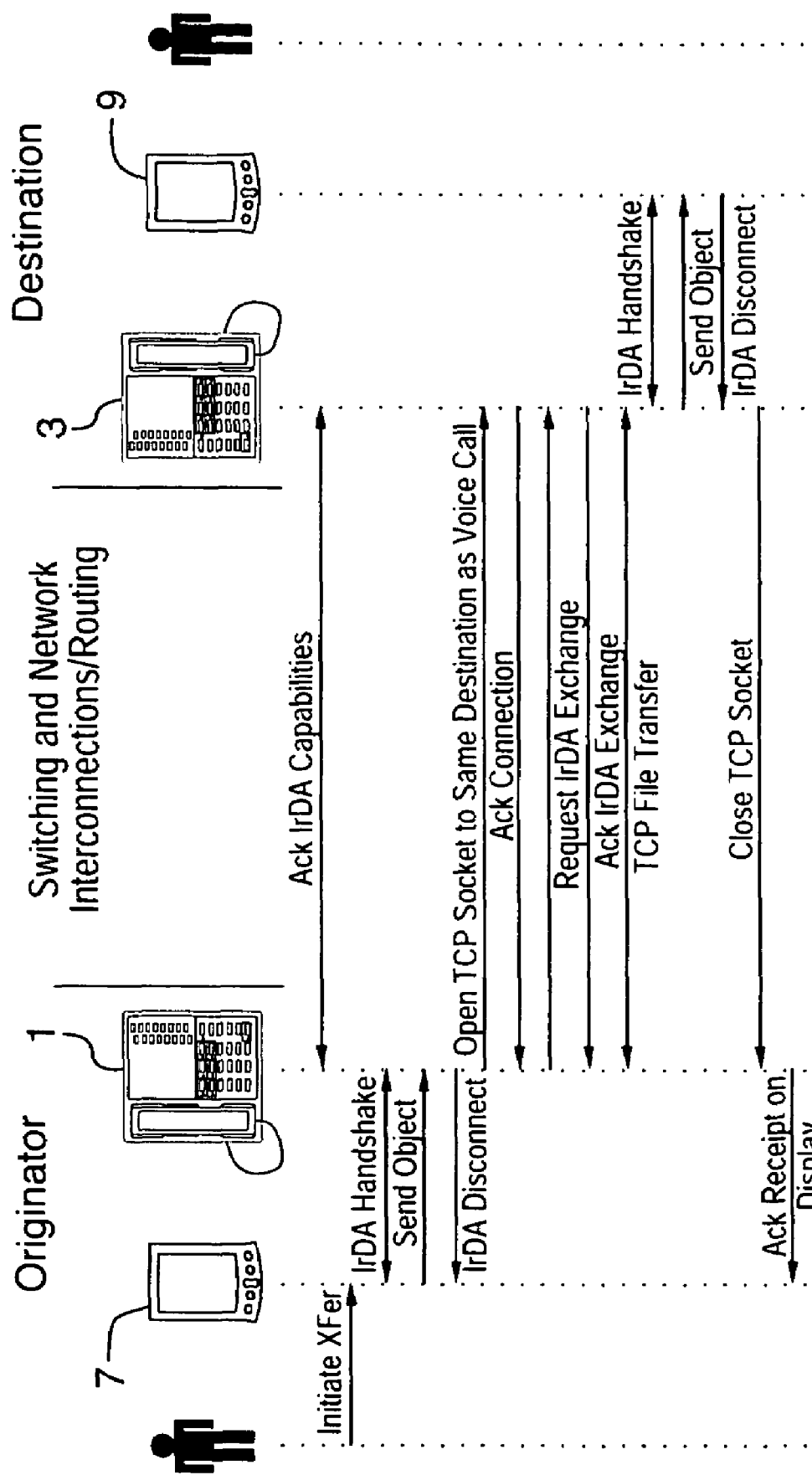
FIG. 3 is a message flow diagram showing buffered PDA to PDA beaming of data for the system of FIG. 1.

As shown in FIG. 3, when the Originator initiates an object exchange, the network portal 1 accepts the connection on behalf of the Destination. The network portals 1 and 3 at either end communicate their capabilities (mainly, whether they support IrDA transfers). If this is not acknowledged at both ends, PDA to PDA transfer is refused (e.g. a message is displayed on the network portals 1 and 3 and the IrDA connection is closed). Thus, IrDA handshaking determines the capabilities of both devices and establishes the master/slave (primary/secondary in IrDA terms) roles.

When the network portal 1 recognizes an incoming IrDA exchange, a TCP socket is opened to the Destination's network portal 3. The Originator PDA 7 attempts to establish communication to PDA 9 by taking on the role of master (primary) and initiates handshaking with the Destination's PDA 9.

Once connections at both ends have been established and acknowledged, the object is sent by the Originator's PDA 7 (i.e. beaming a file) within the range for a local IrDA exchange, to the Originator's network portal 1. The network portal 1 uses the secondary role of the IrDA stack to handshake with the PDA 7 (exchange IR capabilities for speed, timeouts, etc . . . ). When handshaking completes, the PDA 7 sends the object to the network portal 1 where it is cached. The network portal 1 and PDA 7 then disconnect with a success message.

The Originator's network portal 1 then makes a socket call to the Destination's network portal 3 on a predetermined listening port. Both network portals acknowledge the pending IrDA exchange. The object(s) are packetized by the network portal 1 and then transferred to the Destination's network portal 3 over LAN A, the WAN and LAN B.

When the Destination network portal 3 receives the complete file it uses the primary role of the IrDA stack to detect and initiate handshaking with the Destination's PDA 9. If the PDA 9 is detected, the file is beamed to the PDA 9 and an acknowledgment is returned to the Originating network portal's display during the socket closure.

In some environments, it is possible that the network portal 1 of the preferred embodiment may have insufficient memory to buffer a file before it is sent to the Destination. In such instances, the object can be streamed to the Destination PDA 9 while being received at the Originator's network portal 1.

Figure 4:
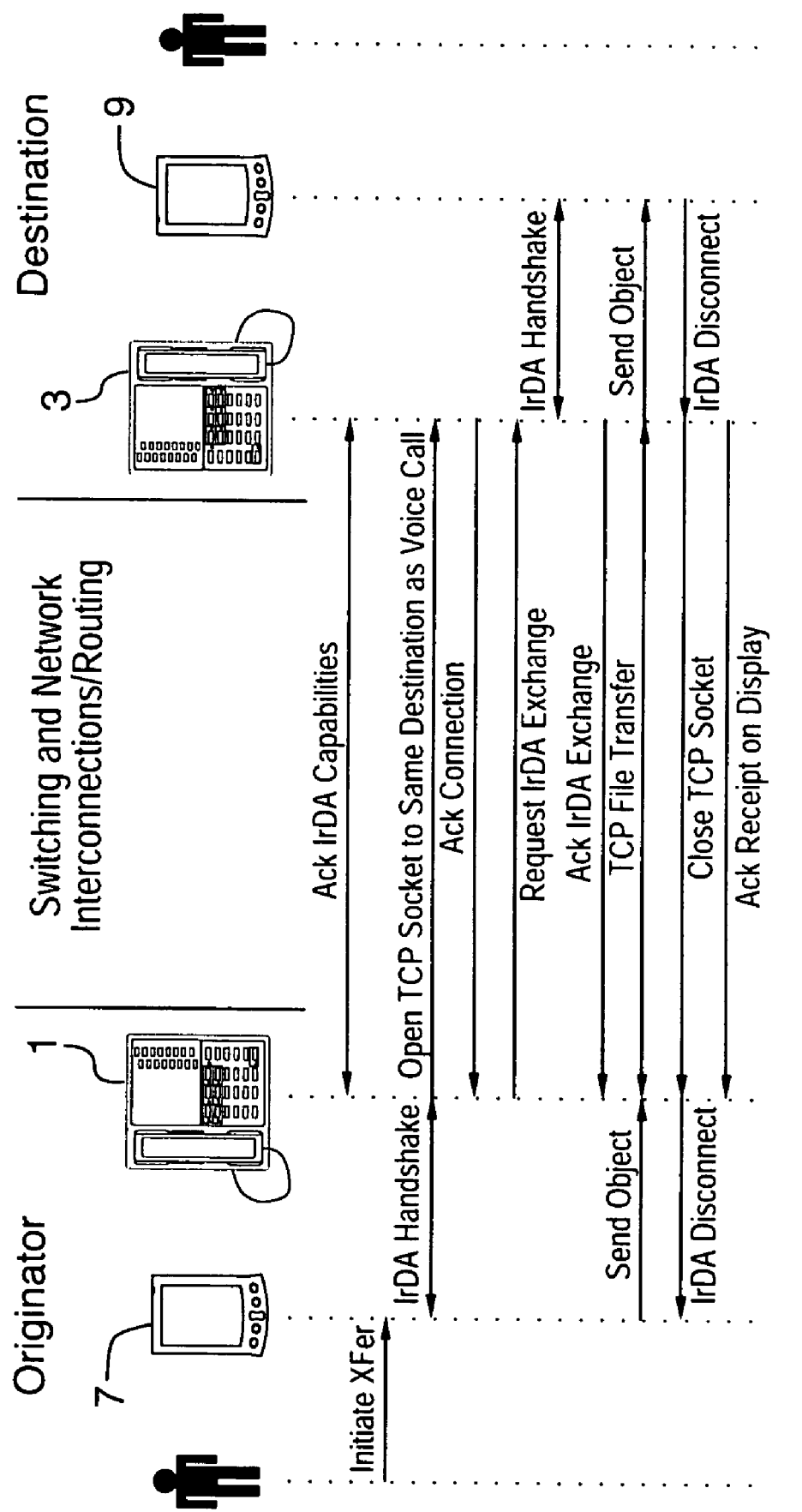
FIG. 4 is a message flow diagram showing non-buffered PDA to PDA beaming of data for the system of FIG. 1.

For example, in the alternative embodiment of FIG. 4, the Originator's network portal 1 "stalls" the Originator's PDA 7 by using empty IrDA retransmission frames until the acknowledgement from the Destination network portal 3 that a PDA 9 exists and is connected. As soon as this acknowledgement is received, each subsequently received IrDA frame is transmitted immediately to the Destination network portal 3 and beamed to the PDA 9. Error messages that are within the higher stack layers are returned to the Originator's network portal 1 for re-sending by the PDA 7.

Once the transfer is complete, an acknowledgment is returned to the Originating network portal's display during the socket closure.

For IrDA to operate smoothly without timeout problems, it is necessary for the network portals to "buffer" the incoming request while trying to establish the destination link. Thus, with reference to the alternative embodiment of FIG. 5, server mediated transfers can be conducted via a server 11 or "mediator" for accepting, buffering and relaying the object on behalf of either network portal 1 or 3.

During the exchange of IrDA capabilities between the two network portals 1 and 3, the IP address of the mediator 11 is provided by the network portal 1 or 3 that cannot support buffered or streamed data. If both network portals report a mediator, the IP of the mediator from the network portal that originated the voice call is chosen.

Figure 5:
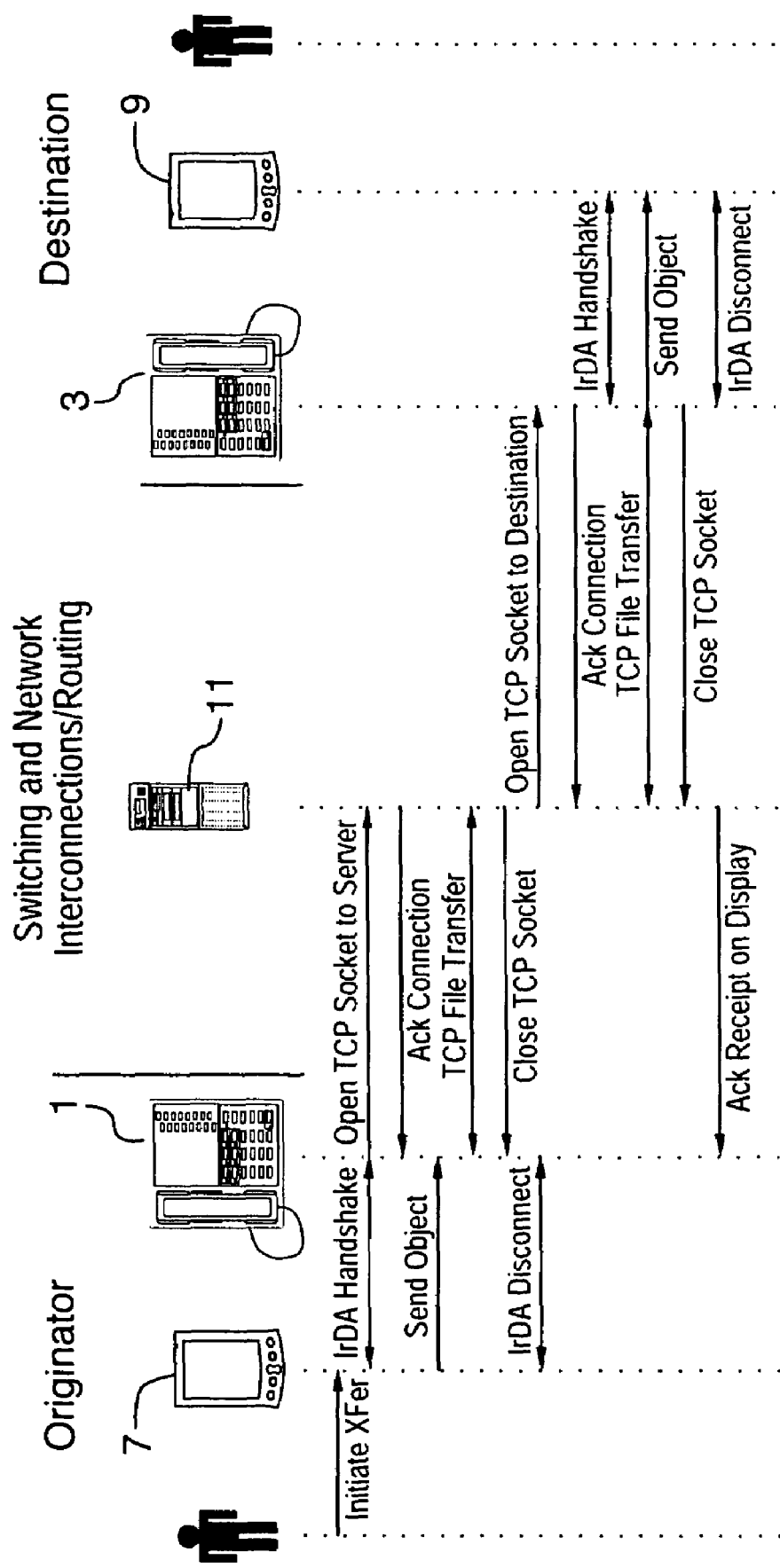
FIG. 5 is a message flow diagram showing server-mediated PDA to PDA beaming of data according to an alternative embodiment of the invention.

In the embodiment of FIG. 5, both the Originator and Destination communicate only with the mediator 11. The Originator's network portal 1 transmits the entire file to the mediator 11 which, once the file is received successfully, then relays the file to the Destination network portal 3. Once the Destination network portal 3 successfully delivers the file to the Destination PDA 9, a message is displayed on the Originating network portal 1.

While the embodiments discussed herein are directed to particular implementations of the present invention, it will be apparent that additional variations and modifications to these embodiments are within the scope of the invention as defined solely by the claims appended hereto.

We claim:

1. A method of transferring data over a network from a first portable electronic device to a second portable electronic device comprising the steps of:

establishing a voice-call path over said network between a first and a second telephony devices by initiating a voice-call connection from said first telephony device to said second telephony device, the first and second telephony devices having first and second network portals, respectively, and capable of supporting a wireless protocol;

initiating a data exchange from said first portable electronic device to said second portable electronic devices, each of said first and second portable electronic devices including said wireless protocol;

sending the data from said first portable electronic device to said first network portal via said wireless protocol;

opening a TCP socket over said network from said first telephony device to said second telephony device using the same address as the voice-call path;

sending the data from said first network portal of the first telephony device to the second network portal of the second telephony device via said socket;

sending the data from said second network portal to said second portable electronic device via said wireless protocol; and terminating said voice-call connection and said voice-call path upon successful transmission of the data, wherein said first and second portable electronic devices are unregistered with said first and second telephony devices.

2. The method of claim 1, wherein said step of initiating said data exchange includes IrDA handshaking between said one of said portable electronic devices and said first network portal, and said other of said portable electronic devices and said second network portal for determining IrDA capabilities and establishing primary/secondary IrDA roles therebetween.

3. The method of claim 1, further comprising the step of buffering said data in said first network portal before sending said data to said second network portal.

4. The method of claim 1, wherein said data is streamed to the other one of said portable electronic devices from said first network portal via said second network portal.

5. The method of claim 4, wherein said first network portal delays the sending of data from said one of said portable electronic devices by using empty IrDA retransmission frames pending receipt of an acknowledgement from said second network portal that said other one of said portable electronic devices is ready to receive said data, whereupon each subsequent IrDA frame of said data sent by said one of said portable electronic devices is transmitted immediately to said second network portal and beamed therefrom to said other one of said electronic devices.

6. The method of claim 1, wherein said step of sending the data from said first network portal to said second network portal further includes transmitting said data in its entirety from said first network portal to a mediator which in response to receipt of the data relays said data to said second network portal.

7. A system for transferring data aver a network from a first portable electronic device to a second portable electronic device comprising:

first and second telephony devices for initiating a voice-call connection from said first telephony device to said second telephony devices, the first and second telephony devices having first and second network portals, respectively, and capable of supporting a wireless protocol;

the first network portal of the first telephony device having a wireless interface for receiving said data beamed from said first portable electronic device via said wireless protocol after said voice-call is established, a TCP socket opened from said first telephony device to said second telephony device using the same address as the voice-call connection;

the second network portal of the second telephony device for receiving the data via said TCP socket, and beaming said data to said second portable electronic device via a further wireless interface and upon successful transmission of said data the voice-call connection is terminated, whereby said data is transferred from said first to said second portable electronic device through said telephony devices and said portable electronic devices are unregistered with said telephony devices.

8. The system of claim 7, wherein said network includes at least one Integrated Communications Platform connected between said IP telephony devices.

9. The system of claim 7, wherein each of said first and second network portals supports IrDA protocol for receiving dialing commands from respective ones of said first and second portable electronic device using the OBEX (Object Exchange) application layer at the top of the IrDA protocol stack.

10. The system of claim 7, wherein said first network portal includes a cache for buffering the data prior to transmission over said network.

11. The system of claim 8, wherein said data is streamed to said second portable electronic device from said first network portal via said second network portal.

12. The system of claim 10, wherein said first network portal includes a cache for buffering said data beamed from said first portable electronic device using empty IrDA retransmission frames pending receipt of an acknowledgement from said second network portal that said second portable electronic device is ready to receive said data, whereupon each IrDA frame of said data sent by said first portable electronic device is transmitted immediately to said second network portal and beamed to said second portable electronic device.

13. The system of claim 7, further including a mediator server for receiving said data in its entirety from said first network portal and in response relaying said data to said second network portal.

\* \* \* \* \*